United States Patent
Choudhary et al.

(10) Patent No.: US 12,149,425 B2
(45) Date of Patent: Nov. 19, 2024

(54) ADJUSTABLE KEEPALIVE TIMER

(71) Applicant: Arista Networks, Inc., Santa Clara, CA (US)

(72) Inventors: Anubhav Choudhary, Bangaluru (IN); Pradeep Sampath Kumar Kanyar, Bangaluru (IN); Xiangyi Guo, San Jose, CA (US); Ravi Krishnamurthy, Bangaluru (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 17 days.

(21) Appl. No.: 17/538,986

(22) Filed: Nov. 30, 2021

(65) Prior Publication Data

US 2023/0171176 A1   Jun. 1, 2023

(51) Int. Cl.
 H04L 12/24    (2006.01)
 H04L 41/0803  (2022.01)
 H04L 43/0864  (2022.01)
 H04L 43/10    (2022.01)
 H04L 43/50    (2022.01)

(52) U.S. Cl.
 CPC .......... H04L 43/10 (2013.01); H04L 43/0864 (2013.01); H04L 43/50 (2013.01)

(58) Field of Classification Search
 CPC ...... H04L 43/10; H04L 43/0864; H04L 43/50
 USPC ........................................................ 709/224
 See application file for complete search history.

(56) References Cited

U.S. PATENT DOCUMENTS

| | | | | |
|---|---|---|---|---|
| 6,212,175 B1* | 4/2001 | Harsch | ............... | H04W 76/25 |
| | | | | 455/466 |
| 6,757,255 B1* | 6/2004 | Aoki | ............... | H04L 69/165 |
| | | | | 370/401 |
| 7,035,214 B1* | 4/2006 | Seddigh | ............... | H04L 1/1635 |
| | | | | 370/231 |
| 8,699,406 B1* | 4/2014 | Charles | ............... | H04J 3/0652 |
| | | | | 709/248 |
| 10,986,027 B1* | 4/2021 | Sears | ............... | H04L 12/4641 |
| 11,190,374 B2* | 11/2021 | Shribman | ............... | H04L 12/2856 |
| 2007/0294426 A1* | 12/2007 | Huang | ............... | H04L 1/1614 |
| | | | | 709/234 |
| 2008/0225842 A1* | 9/2008 | Goldfein | ............... | H04L 1/1825 |
| | | | | 370/389 |
| 2009/0006641 A1* | 1/2009 | Yaqoob | ............... | H04L 12/1886 |
| | | | | 709/231 |
| 2009/0010205 A1* | 1/2009 | Pratt, Jr. | ............... | H04W 56/002 |
| | | | | 370/328 |
| 2009/0059814 A1* | 3/2009 | Nixon | ............... | H04W 16/18 |
| | | | | 370/254 |
| 2012/0147899 A1* | 6/2012 | Du | ............... | H04L 12/413 |
| | | | | 370/447 |

(Continued)

*Primary Examiner* — Moustafa M Meky
*Assistant Examiner* — Elizabeth Kassa
(74) *Attorney, Agent, or Firm* — Fountainhead Law Group, PC (57) ABSTRACT

Keepalive packets are transmitted between a sender node and a receiver node at an interval that varies depending on the transit times of previously transmitted keepalive packets. The transit time is based on when a keepalive packet is transmitted to the receiver node and when a corresponding feedback packet is received from the receiver node. The transmission interval varies depending on the path conditions between the sender node and the receiver node, which may be reflected in the transit time.

17 Claims, 5 Drawing Sheets

(56) References Cited

U.S. PATENT DOCUMENTS

| | | | | |
|---|---|---|---|---|
| 2013/0067059 A1* | 3/2013 | Gatta | H04L 43/04 | |
| | | | 709/224 | |
| 2013/0067063 A1* | 3/2013 | Vasseur | H04L 45/026 | |
| | | | 709/224 | |
| 2013/0170358 A1* | 7/2013 | Chen | H04L 47/32 | |
| | | | 370/237 | |
| 2014/0164640 A1* | 6/2014 | Ye | H04L 47/30 | |
| | | | 709/235 | |
| 2014/0201388 A1* | 7/2014 | Dajani | H04L 69/164 | |
| | | | 709/232 | |
| 2015/0359016 A1* | 12/2015 | Barany | H04W 24/08 | |
| | | | 709/224 | |
| 2016/0087907 A1* | 3/2016 | Ajitomi | H04L 47/28 | |
| | | | 370/389 | |
| 2016/0174288 A1* | 6/2016 | Backholm | H04W 76/25 | |
| | | | 370/338 | |
| 2016/0191364 A1* | 6/2016 | Ajitomi | H04L 43/10 | |
| | | | 709/224 | |
| 2018/0337833 A1* | 11/2018 | Attarwala | H04L 45/22 | |
| 2018/0375624 A1* | 12/2018 | Kim | H04L 1/1838 | |
| 2021/0067577 A1* | 3/2021 | Shribman | H04L 67/568 | |
| 2021/0176301 A1* | 6/2021 | Mutnuru | H04L 43/10 | |
| 2022/0150754 A1* | 5/2022 | Perras | H04W 28/0289 | |
| 2022/0256636 A1* | 8/2022 | Dutta | H04L 5/0048 | |
| 2024/0064104 A1* | 2/2024 | Sears | H04L 47/125 | |

* cited by examiner

ADJUSTABLE KEEPALIVE TIMER

BACKGROUND

A mechanism for detecting faults between nodes (e.g., switches, routers, L3 switches, etc.) in a network involves exchanging keepalive/hello packets among the nodes. For example, a sender node sends a keepalive packet (message) to a receiver node. The receiver node returns a feedback packet. The status of the path or connection between the nodes (Good, Suspect, Bad, etc.) can be assessed based on the transit delay between sending the keepalive packet and receiving the feedback packet. The keepalive mechanism is useful because if the receiver node is faulty (e.g., has crashed or is otherwise compromised), the fault can be detected by the absence of a feedback packet or a long transit delay. For example, the keepalive packet can contain a timestamp of when the sender node sent the packet. The receiver node can copy that timestamp into a feedback packet that is then sent back to the sender node. The sender node can compute the transit delay from the timestamps in the keepalive packet and the corresponding returned feedback packet.

In a large network of nodes, there can be hundreds to many thousands of paths. The conventional keepalive mechanism can impact network performance; sending too many keepalive packets can reduce the capacity to carry data packets. Sending too few keepalive packets can impact the ability to detect connection faults.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

When two nodes are connected through a network, a keepalive mechanism can be enabled to provide fault detection of the path between the two nodes. The keepalive mechanism typically involves transmitting keepalive packets and receiving corresponding feedback packets (also referred to as ACKs). Generally, the keepalive packets are sent at a fixed frequency, which may not be suitable for all situations. For example, if the latency is very low (e.g., 30 ms) and the node is sending keepalive packets every 1000 ms, then the node is not operating at full potential as there is potential for improving link failure detection time by increasing keepalive transmission frequency. On the other hand, if the latency is high (e.g., 1500 ms) and the node is sending keepalive packets every 500 ms, then the node is wasting the resources by sending unnecessary keepalive packets.

Keepalive processing in accordance with the present disclosure enables the node to adjust the keepalive transmission frequency dynamically based on the latency experienced between the nodes. This helps to balance between resource utilization and link failure detection time. This has practical applicability by compensating for fluctuations in the latency between nodes, and facilitating configuring keepalive processing by obviating manual setup between node.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
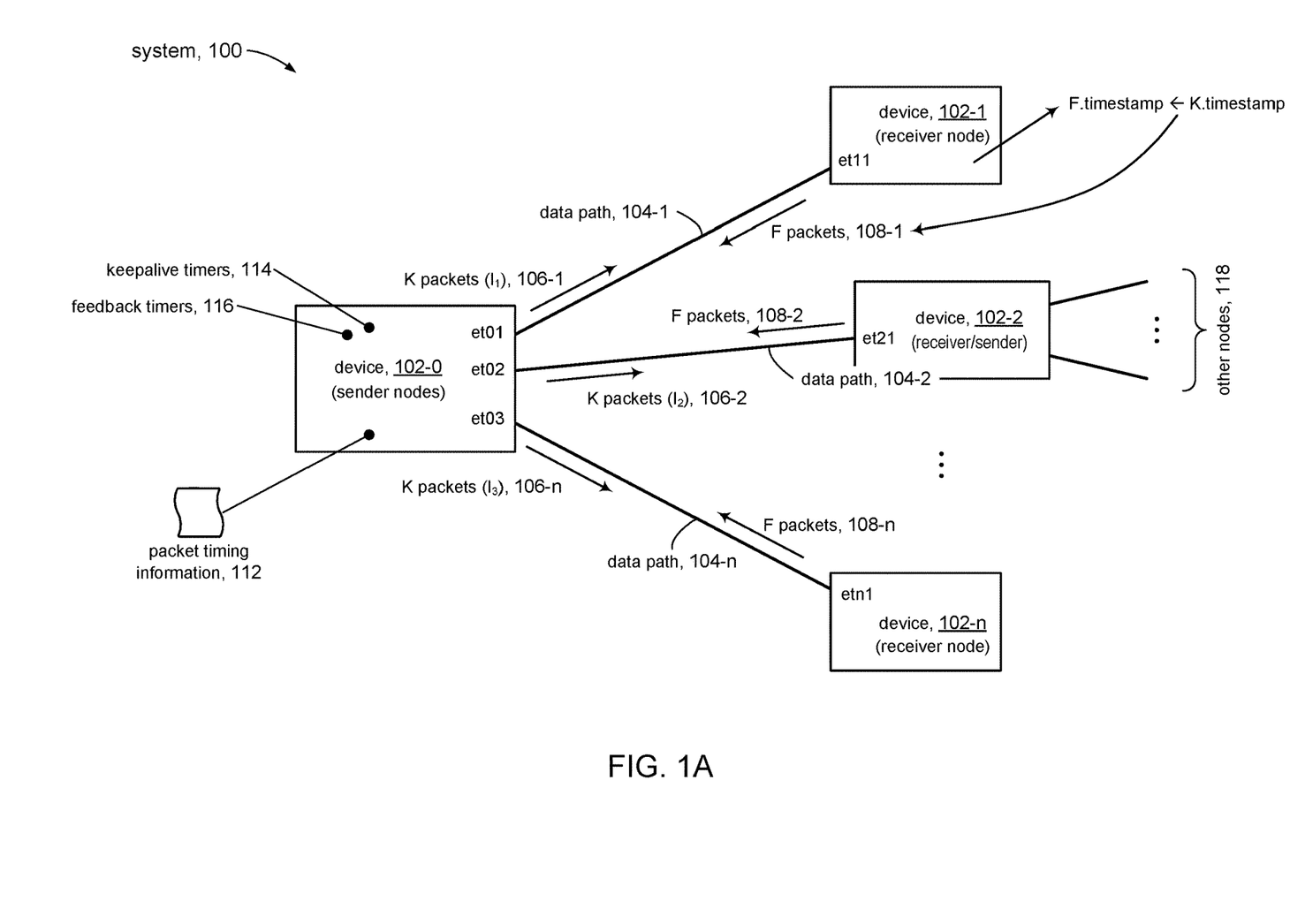
FIG. 1A is a high-level block diagram showing keepalive processing in a system in accordance with the present disclosure.

FIG. 1A shows a simplified system of nodes 100 in accordance with the present disclosure. System 100 comprises network devices 102-0, 102-1, 102-2, . . . 102-$n$ (collectively 102). Network devices 102 include switches, routers, gateways, L3 switches, and so on. Network devices 102 represent endpoints between data paths 104. For example, network devices 102-0, 102-1 are the endpoints of data path 104-1, and more particularly port et01 on device 102-0 and port et11 on device 102-1. Likewise, ports et02, et21 on respective devices 102-0, 102-2 are the endpoints of data path 104-2, and ports et03, etn1 on respective devices 102-0, 102-$n$ are the endpoints of data path 104-$n$. A given port on a given device can be collectively referred to as a node. For example, port et01 on device 102-0 can be referred to as a node, port et11 on device 102-1 is a node, and so on. Network devices 102 can be referred to herein as nodes with the understanding that "node" refers to the device and a port on the device.

Keepalive messaging can be used to assess the connection status between nodes. For example, a sender node (e.g., device 102-0, port et01) can send keepalive packets 106 to one or more connected receiver nodes (e.g., respective ports on devices 102-1, 102-2, . . . 102-$n$). Each receiver node 102-1 to 102-$n$ can reply with a corresponding feedback packet 108. Sender node 102-0, for example, can send keepalive packets 106-1 to receiver node 102-1, In response, receiver node 102-1 can reply with corresponding feedback packets 108-1. Likewise, with keepalive packets 106-2 and feedback packets 108-2 between sender node 102-0 and receiver node 102-2.

In accordance with the present disclosure, sender node 102-0 can send recurring keepalive packets to receiver nodes 102-1 to 102-$n$. Sender node 102-0 can perform keepalive messaging with the receiver nodes at different respective intervals (or frequencies). For example, the sender node can transmit keepalive packets 106-1 to receiver node 102-1 every $I_1$ units of time (e.g., seconds, minutes, etc.). Sender node 106-0 can transmit keepalive packets 106-2 to receiver node 102-2 every $I_2$ units of time different from $I_1$, and so on. Moreover, in accordance with the present disclosure, the intervals $I_1$, $I_2$, etc. can vary over time. In accordance with some embodiments, the sender node can maintain packet timing information 112 to store various corresponding timing values for each receiver node to manage keepalive messaging with the receiver node.

In accordance with the present disclosure, the sender node can include keepalive timers 114 to determine when to send keepalive packets to respective receiver nodes. Feedback timers 116 can be used to determine whether feedback packets are returned from receiver nodes within predetermined times.

It is noted that nodes 102 can be both sender nodes and receiver nodes. For example, FIG. 1A shows that node 102-2 operates as a receiver node by virtue of receiving and responding to keepalive packets 106-2 from node 102-0. Node 102-2, however, can also operate as a sender node with respect to other nodes 118 when it transmits keepalive packets (not shown) to one or more of those other nodes.

Figure 1B:
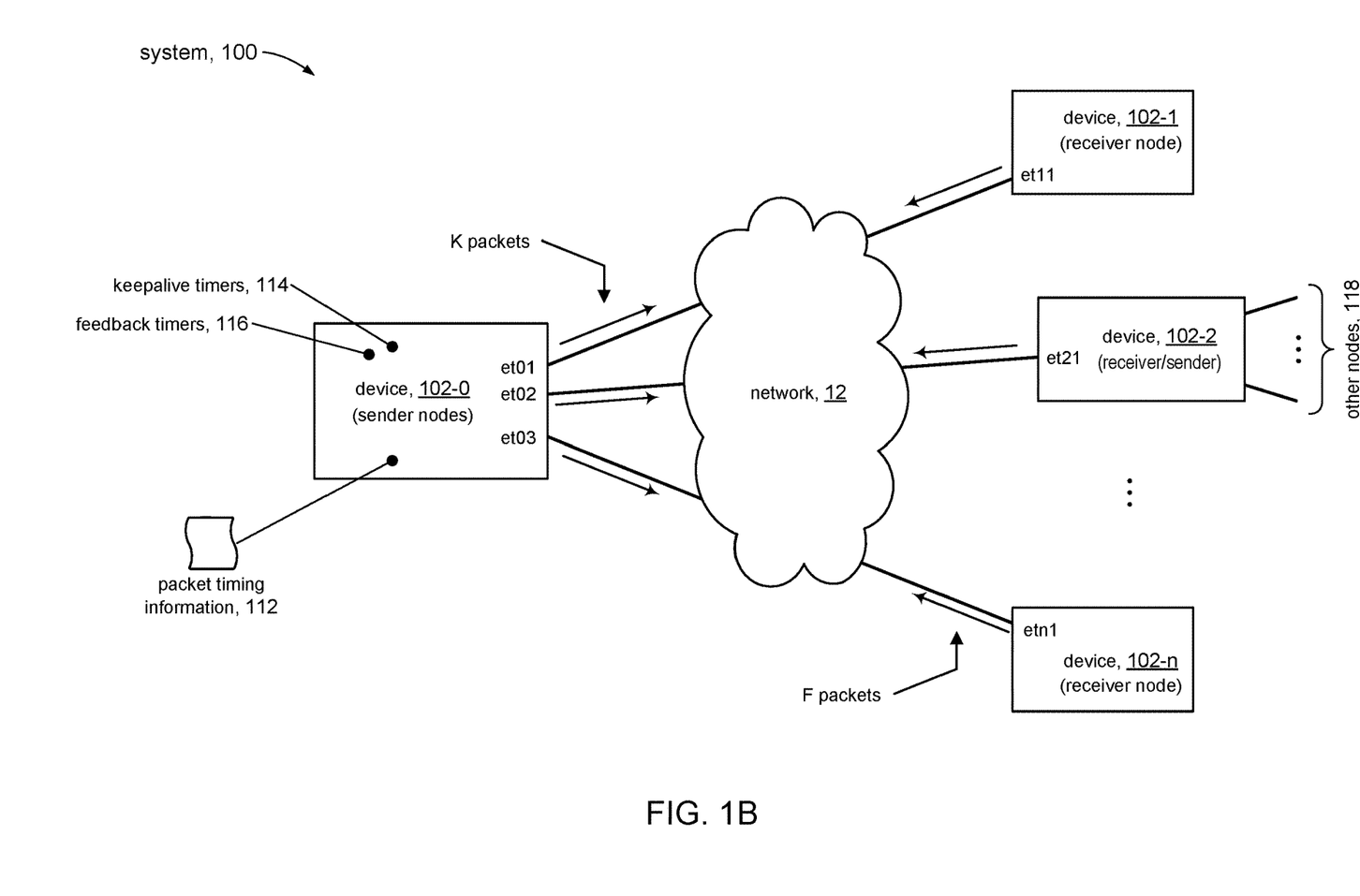
FIG. 1B shows the path configuration of FIG. 1A in the networked deployment.

FIG. 1B shows the same configuration of paths between network device 102-0 and network devices 102-1, 102-2, 102-3 as shown in FIG. 1A, except that the paths in FIG. 1B are connected via network 12.

Figure 2:
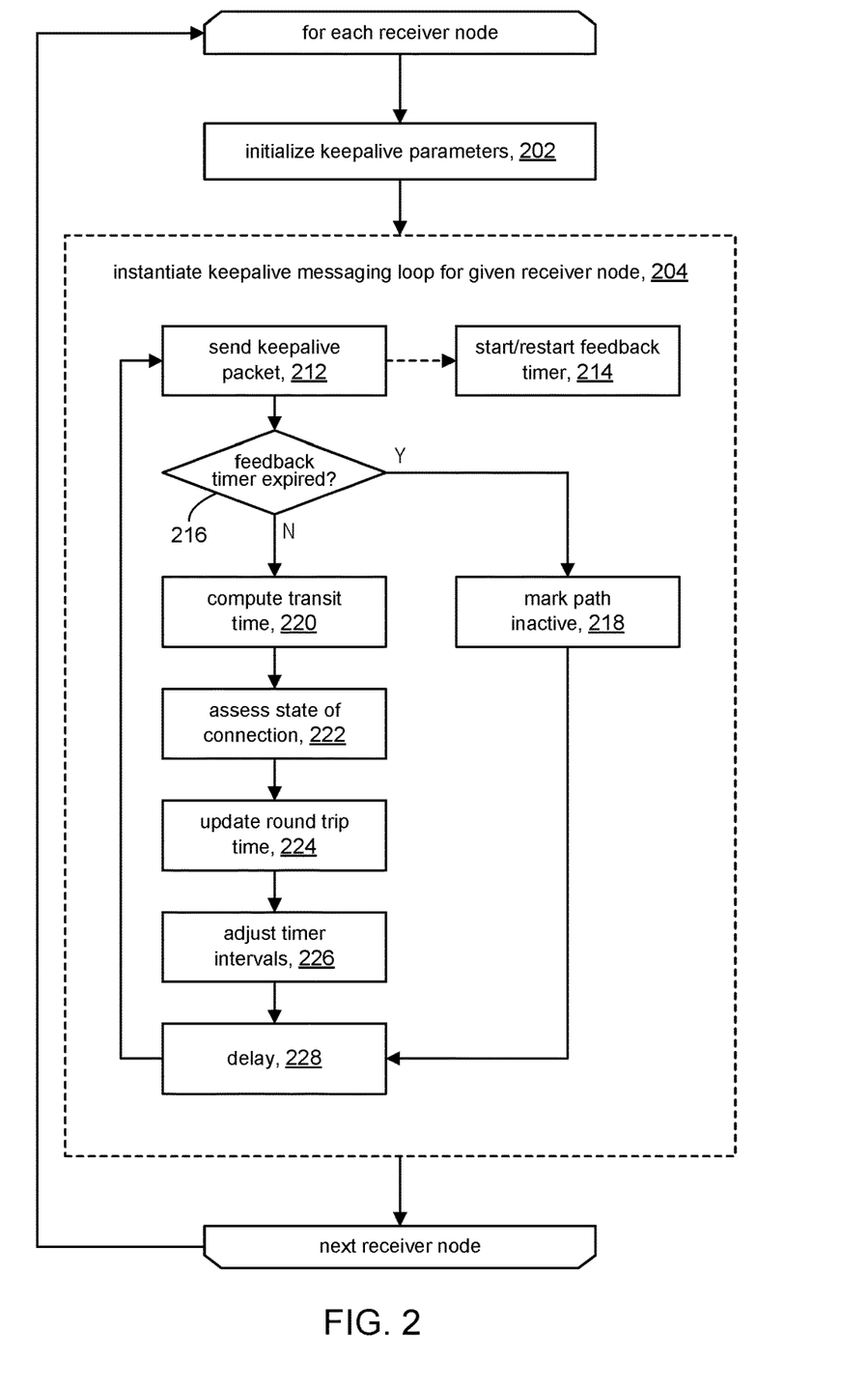
FIG. 2 shows operation for keepalive processing in accordance with the present disclosure.

Referring to FIG. 2, the discussion will now turn to a high level description of processing in a node operating as a sender node (e.g., 102-0) in accordance with the present disclosure. In some embodiments, for example, the sender node can include computer executable program code, which when executed by a processor (e.g., 412a, FIG. 4) in the sender node, can cause the sender node to perform processing in accordance with FIG. 2. The flow of operations performed by the sender node is not necessarily limited to the order of operations shown.

As noted above, a node operating as a sender node can be configured to transmit keepalive packets to all or only some receiver nodes to which the sender node is connected. For each receiver node (referred to below as the given receiver node) with which the sender node is configured to transmit keepalive packets, the sender node can perform the following operations:

At operation 202, the sender node can initialize parameters for managing keepalive transmissions to be performed with the given receiver node; e.g., when the sender node makes an initial connection with the receiver node. The parameters can be stored as packet timing information 112 in a memory of the sender node and associated with the given receiver node. In some embodiments, separate packet timing information 112 can be maintained for each receiver node.

The parameters can be initialized before the sender node begins transmitting keepalive packets to the receiver node. In some embodiments, for example, the keepalive parameters associated with the given receiver node can include:

path (connection) state—This represents the state of the path or connection with the receiver node.

KA_interval—This is a transmission interval that represents the frequency with which keepalive packets are transmitted to the given receiver node. The KA_interval can be expressed in units of milliseconds, seconds, etc. For example, a KA_interval of ten seconds can indicate that the sender node will transmit one keepalive packet to the receiver node every ten seconds. The keepalive interval can be initialized to some suitable initial value of time, for example 10 seconds, and periodically updated.

FB_interval—This is a response interval that represents the length of time that the sender node will wait for a feedback packet corresponding to a previously transmitted keepalive packet before marking the path as INACTIVE. The feedback interval can be initialized to some suitable initial value of time, for example 15 seconds, and periodically updated.

Round Trip Time (RTT)—Generally, the round trip time of a keepalive packet refers to the time between when a keepalive packet was transmitted to the receiver node and when the corresponding feedback packet was received from the receiver node. As used herein, "RTT" will refer to a learned round trip time that can be computed from a history of keepalive/feedback transmissions. The terms "RTT sample" and "transit time" will refer to the individual round trip times for a given keepalive/feedback transmission to distinguish from the learned RTT. Because the sender node initially is unaware of the latency between itself and the given receiver node, RTT can be initialized to a suitable initial value when the sender node first establishes a communication path with the given receiver node.

At operation 204, the sender node can instantiate, spawn, or otherwise invoke a keepalive process to perform keepalive messaging with the given receiver node. The keepalive process can execute concurrently with other processes executing on the sender node, including other keepalive messaging processes for other receiver nodes. The sender node can continue at operation 202 to set up keepalive messaging with another receiver node. Each instance of the keepalive messaging process can iterate in a loop and perform the following operations in connection with the given receiver node:

At operation 212, the sender node can transmit a keepalive packet to the given receiver node. After the setting up a path with the given receiver node, the sender node can begin transmitting keepalive packets on a repeated basis. In some embodiments, the sender node can incorporate a timestamp into each keepalive packet that is associated with the time at which the keepalive packet was sent.

At operation 214, the sender node can start/restart a feedback timer (e.g., 116). In some embodiments, for example, the feedback timer can be a software timer. For the first time through the loop, the sender node starts the feedback timer at or around the time of transmitting the first keepalive packet. For subsequent passes through the loop, the sender node restarts the feedback timer at or around the time of transmitting a subsequent keepalive packet. The feedback timer can be set to run for an amount of time substantially equal to the FB_interval. It is noted that a feedback timer is started for each receiver node to which the sender node sends keepalive packets.

At decision point 216, if the feedback timer expires before a feedback packet is received, then processing can continue with operation 218 to process a timeout. If the feedback timer does not expire before a feedback packet is received, then processing can continue with operation 220 to process the received feedback packet.

At operation 218, the sender node can mark the path as being in an INACTIVE state. When the sender node transmits a keepalive packet to the given receiver node, the sender will waif for a corresponding feedback packet to be sent from the receiver node. The wait period is set by FB_interval. When the feedback timer expires before receiving the corresponding feedback packet, this constitutes a timeout which can be deemed to indicate that the connection to the given receiver node, or the receiver node itself, is down. In some embodiments, the sender node can mark the state of the path/receiver node as INACTIVE. Processing can continue at operation 228 to continue sending keepalive packets in order to detect if and when the path/receiver node comes back up.

At operation 220, the sender node can compute the RTT sample (transit time) of the transmitted keepalive packet. When a feedback packet is received before the feedback timer expires, the path is deemed active. As explained above, RTT sample is defined as the round trip time for a particular pair of keepalive/feedback packets. Here, the RTT sample is the time between when the keepalive packet was transmitted to the given receiver node and when a corresponding feedback packet was received from the given receiver node. As noted above, in some embodiments, the keepalive packet can include a timestamp that is associated with when the keepalive packet was sent. In some embodiments, the given receiver node can respond to receiving the keepalive packet by generating a corresponding feedback packet and transmitting the feedback packet back to the sender node. The given receiver node can copy the timestamp contained in the received keepalive packet into the feedback packet. The sender node can compute the RTT sample using the timestamp contained in the feedback packet; e.g., by taking the difference between the time of receipt of the feedback packet and the timestamp.

At operation 222, the sender node can assess the state of the connection (path) with the given receiver node. In some embodiments, state can be assessed based on the latency between sending the keepalive packet and receiving the corresponding feedback packet, namely the RTT sample. For example, the RTT sample can be compared to a predetermined latency period. If the RTT sample is less than or equal the predetermined latency, then the state of the connection can be marked accordingly; e.g., GOOD. If the RTT sample is greater than the predetermined latency, then the sender node mark the state of the connection accordingly; e.g., BAD, CONGESTED, etc. In some embodiments, multiple predetermined latency periods can be defined so that the connection between the sender node and the given receiver node can be assessed in degrees of quality; e.g., GOOD, SLOW, BAD, etc. In some embodiments, a global predetermined latency period(s) can be assigned for the entire network so that every device is assessed according to the same global latency. In other embodiments, predetermined latency periods can be assigned on a per subnetwork basis, or at finer granularities down to a per receiver node basis. The predetermined latency period can be stored as part packet timing information 112 associated with the given receiver node.

At operation 224, the sender node can update the learned round trip time (RTT) based on the RTT sample of the keepalive packet. In accordance with the present disclosure, RTT represents a learned round trip time associated with the given receiver node that is computed from a collection of individual transit times of previous keepalive/feedback transmissions with the given receiver node. RTT for the given receiver node is "learned" in the sense that RTT can be repeatedly updated based on the individual RTT samples from previous keepalive/feedback transmissions.

In accordance with the present disclosure, RTT is maintained for each receiver node to which the sender node is configured to send keepalive packets. Stated differently, an RTT is maintained on a per path basis.

In accordance with some embodiments, RTT for the given receiver node can be computed based on RTT samples accumulated from repeated transmissions of keepalive/feedback packets. In some embodiments, for example, RTT can be the average of the RTT samples of the keepalive packets transmitted to the given receiver node; each time the RTT sample is computed for a keepalive packet, the average RTT sample can be updated. In other embodiments, for example, the RTT for the given receiver node can be updated according to the following procedure:

```
IF RTT == 0:          // this applies for the first iteration
    RTT = RTT_SAMPLE
else:                 // this applies for subsequent iterations
    RTT = RTT * (1−Q) + RTT_SAMPLE × (Q)
``` where RTT_SAMPLE is the RTT sample described above,
Q is scale factor for computing a weighted average. In some embodiments, the scale factor can be set to 0.5, but can be set to any other value. In some embodiments, the scale factor can be set on a per node basis.

At operation 226, the sender node can adjust the timer intervals. In some embodiments, for example, KA_interval can be updated every one or more iterations through the loop. In other words, the transmission interval (and hence frequency) for sending keepalive packets can be repeatedly updated. In some embodiments, for example, KA_interval can be updated based on RTT, as follows:

NEW_INTERVAL=MAX(RTT×INTERVAL_FACTOR,MIN_KA_INTERVAL); IF NEW_INTERVAL IS NOT WITHIN 10% OF KA_INTERVAL, THEN
KA_INTERVAL=NEW_INTERVAL where NEW_INTERVAL is the candidate for updating KA_interval,
INTERVAL_FACTOR is a scale factor for scaling RTT to provide a margin for the updated KA_interval; INTERVAL_FACTOR can be set to any suitable value; e.g., 1.5,
MIN_KA_INTERVAL sets a minimum interval (and hence maximum frequency) for transmitting keepalive packets,
the 10% range can be made narrower or wider, depending on how aggressively we want to transmit keepalive packets.

Likewise, the interval for waiting for a feedback packet, namely FB_interval, can be repeatedly updated every one or more iterations through the loop. In some embodiments, for example, FB_interval can be updated as follows:

FB_INTERVAL=KA_INTERVAL×
FEEBBACK_SCALE where FEEBBACK_SCALE is a scaling factor and can be set to any suitable value; e.g., 5. The scaling factor can be set depending on how aggressive we want to be in terms of waiting for a feedback packet.

At operation 228, the sender node can delay for a period of time based on KA_interval before sending the next keepalive packet; this is the transmission interval. In some embodiments, the sender node can initiate a keepalive timer (e.g., 114) to run for a time substantially equal to KA_interval. When the timer expires, processing can proceed to operation 212 where the next keepalive packet can be transmitted to start the next iteration of the loop.

By adjusting the KA_interval based on the RTT samples of keepalive/feedback pairs, the frequency at which keepalive packets are transmitted can be adjusted as the latency experienced between the sender node and the receiver node varies over time. This facilitates balancing resource utilization for transmitting keepalive packets and detecting link failures in a timely manner as latency varies over time.

Ideally, it is preferable to send keepalive packets at a high frequency in order to detect link failures as soon as possible. However, if the latency in the link exceeds the transmission interval then we are transmitted unnecessary keepalive packets, which is wasteful of both bandwidth on the link and of processing resources on the sender node. In accordance with the present disclosure, the transmission interval KA_interval tracks with latency. The transmission interval decreases as latency decreases so that keepalive packets can be transmitted more frequently to detect link failures more quickly, and the transmission interval increases as latency increases in order not to waste link bandwidth and processing resources on unnecessary keepalive packets.

Adjusting the KA_interval in accordance with the present disclosure can account for fluctuations in latency between nodes. Automating the adjustment in accordance with the present disclosure obviates the manual effort of a user (e.g., network administrator) having to measure the latency between nodes and determining and configuring a suitable keepalive frequency. The manual effort can become a challenge in any sizeable network deployment (e.g., having many tens of network devices) and/or where network traffic conditions are very dynamic with constantly varying latencies. It such situations, adjusting keepalive frequencies in accordance with the present disclosure offers a practical solution to the challenge.

In some embodiments, the value of MIN_KA_INTERVAL mentioned above in connection with updating KA_interval can itself be dynamic. The MIN_KA_INTERVAL sets an upper bound on how frequent keepalive packets are sent. Its value can have an impact on the bandwidth of the link between the sender and receiver nodes. For example, in a given deployment a sender node can have connections to over 1000 paths. When the latency between the sender node the receiver nodes is very low, this creates a risk that the KA intervals for the receiver nodes can become too low, resulting in excessive keepalive messages which can exhaust link capacity. Accordingly, in some embodiments, MIN_KA_INTERVAL can be adjusted on a periodic basis (e.g., every n iterations) as follows:

AVAILABLE_BANDWIDTH=LINK_CAPACITY×
KEEPALIVE_LINK_BUDGET

BADWIDTH_QUOTA_PER_PATH=AVAILABLE_BANDWIDTH/
TOTAL_PATHS

NUM_KEEPALIVE_PKTS_PER_SEC=BANDWIDTH_
QUOTA_PER_PATH/SIZE_OF_KEEPALIVE

MIN_KA_INTERVAL=1000/NUM_
KEEPALIVE_PKTS_PER_SEC where LINK_CAPACITY is the total bandwidth of the sender node for all communications with other nodes,
KEEPALIVE_LINK_BUDGET is the percentage of link capacity allocated for keepalive messages,
TOTAL_PATHS is the total number of paths currently configured on the sender node,
SIZE_OF_KEEPALIVE is the size of a keepalive packet.

Figure 3:
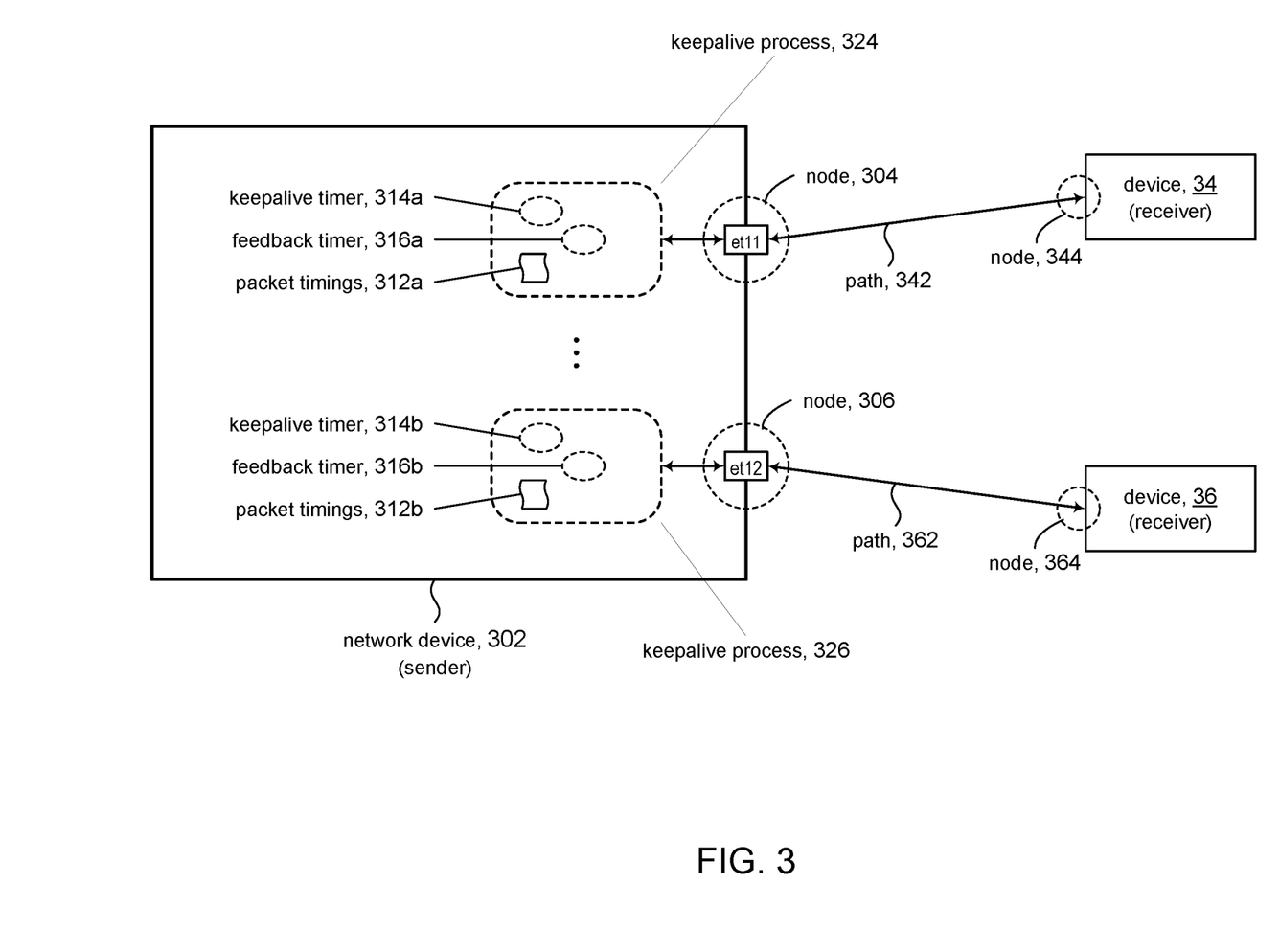
FIG. 3 illustrates processes in a network device for keepalive processing in accordance with the present disclosure.

FIG. 3 shows additional details in a network device for processing keepalive packets in accordance with the present disclosure. Network device 302 is shown with two ports et11 and et12 which represent two sender nodes 304, 306. Path 342 connects sender node 304 to receiver node 344 on network device 34. Likewise, path 362 connects sender node 306 to receiver node 364 on network device 36.

In some embodiments, each sender node 304, 306 is associated with a corresponding keepalive processes 324, 326 that are instantiated by and execute on network device 302 in accordance with FIG. 2. Process 324, for example, includes software timers 314a, 316a and packet timing information 312a to support keepalive messaging path 342 between node 304 and 344. Keepalive timer 314a can be used to trigger sender node 304 when to send keepalive packets to receiver node 344. Feedback timer 316a can be used to detect a timeout when sender node 304 waits for a feedback packet from receiver node 344. Packet timing information 312a can be stored in a memory in network device 302, comprising information such as KA-interval and FB_interval for the keepalive messaging between sender node 304 and receiver node 344. Packet timing information 312a can also include the other information described in FIG. 2 for managing the keepalive messaging. Process 326, likewise, performs keepalive messaging on path 362 between sender node 306 and receiver node 364, and includes timers 314b, 316b and packet timing information 312b to the support the keepalive messaging.

Figure 4:
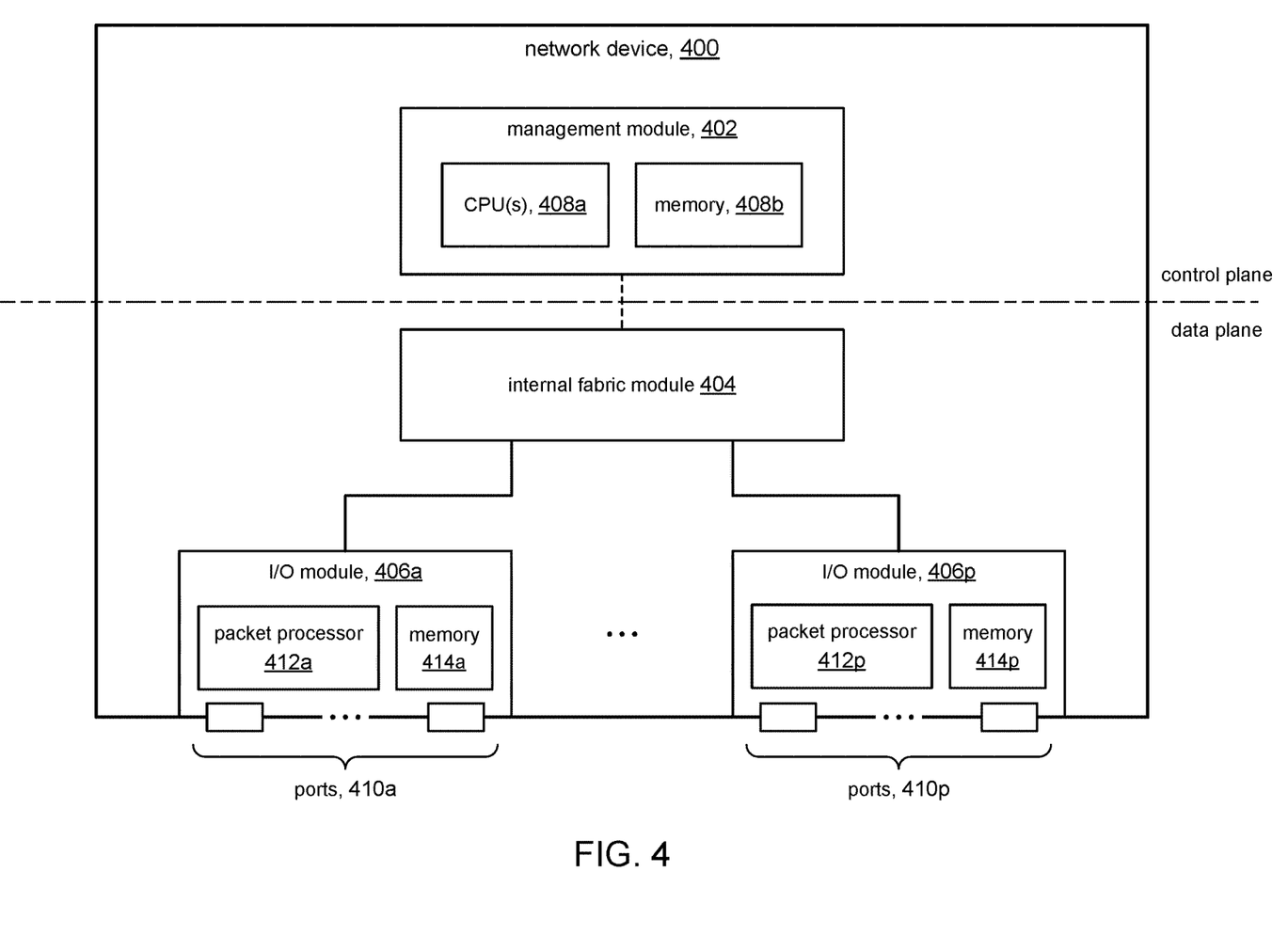
FIG. 4 shows details for a network device as described in the present disclosure.

FIG. 4 depicts an example of a network device 400 (e.g. 102-0, FIG. 1A, 302, FIG. 3) in accordance with some embodiments of the present disclosure. As shown, network device 400 includes a management module 402, an internal fabric module 404, and a number of I/O modules 406a-406p. Management module 402 includes the control plane (also referred to as control layer) of network device 400 and can include one or more management CPUs 408a for managing and controlling operation of network device 400 in accordance with the present disclosure. Each management CPU 408a can be a general purpose processor, such as but not limited to an Intel®/AMD® x86 or ARM® processor, that operates under the control of software stored in a memory 408b, such as dynamic random access memory (DRAM). Control plane refers to all the functions and processes that determine which path to use, such as routing protocols, spanning tree, and the like.

Internal fabric module 404 and I/O modules 406a-406p collectively represent the data plane of network device 400 (also referred to as data layer, forwarding plane, etc.). Internal fabric module 404 is configured to interconnect the various other modules of network device 400. Each I/O module 406a-406p includes one or more input/output ports 410a-410p that are used by network device 400 to send and receive network packets. Each I/O module 406a-406p can also include a packet processor 412a-412p and a respective memory component 414a-414p. Each packet processor 412a-412p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane. In accordance with the present disclosure, the memory components can hold information for processing keepalive messaging, including KA_interval, FB_interval, RTT, and so on.

Further Examples

In accordance with the present disclosure, a method in a network device comprises: (a) transmitting a forward packet from the (sender) network device to a first receiver network device; (b) receiving a return packet from the first receiver network device corresponding to the forward packet; (c) computing a transit time between the sender network device and the first receiver network device according to when the forward packet was transmitted and when the return packet was received; (d) updating a transmit interval based at least in part on the transit time; (e) running a transmit timer for a time substantially equal to the updated transmit interval; and (f) subsequent to expiration of the transmit timer, repeating (a) to (e).

In some embodiments, the method further comprises repeating (a) to (f) with at least a second receiver network device.

In some embodiments, the method further comprises computing an updated round trip time based on transit times from previous keepalive packets. Updating the transmit interval is further based the updated round trip time.

In some embodiments, the method further comprises setting the updated transmit interval to a minimum interval when updating the transmit interval results in a value less than the minimum interval. In some embodiments, the minimum interval is based on a number of receiver network devices to which the sender network device transmits forward packets.

In some embodiments, the method further comprises performing (a) to (f) with a second receiver network device. The transmit interval associated with the first receiver network device is different from a transmit interval associated with the second receiver network device.

In some embodiments, the method further comprises computing feedback time based on a current value of the transmit interval and using the feedback time to assess a status of a connection between the sender network device and the first receiver network device. In some embodiments, the method further comprises designating the connection between the sender network device and the first receiver network device as being INACTIVE when a feedback packet corresponding to a given keepalive packet is not received within the feedback time.

In accordance with the present disclosure, a network device comprises one or more computer processors; and a computer-readable storage medium comprising instructions for controlling the one or more computer processors to: transmit keepalive packets to a first receiver; and receive corresponding feedback packets from the first receiver. The keepalive packets are transmitted to the first receiver at a transmit interval that varies as transit times between transmitting keepalive packets and receiving corresponding feedback packets vary.

In some embodiments, the computer-readable storage medium further comprises instructions for controlling the one or more computer processors to compute the transit times for pairs of transmitted keepalive packets and corresponding feedback packets. The transmit interval is repeatedly updated based on transit times computed for previously transmitted keepalive packets and their corresponding feedback packets. In some embodiments, each keepalive packet includes a timestamp indicative of when the keepalive packet was transmitted. Each feedback packet includes the timestamp contained in the corresponding keepalive packet. The transit time for a transmitted keepalive packet and its corresponding feedback packet is computed based on when the feedback packet was received and the timestamp contained in the feedback packet.

In some embodiments, the updated transmit interval is limited to no less than a minimum transmit interval. In some embodiments, the minimum transmit interval is based on a number of receiver network devices to which the network device transmits keepalive packets.

In some embodiments, the computer-readable storage medium further comprises instructions for controlling the one or more computer processors to transmit keepalive packets to a second receiver and receive corresponding feedback packets from the second receiver. Keepalive packets are transmitted to the second receiver at a transmit interval computed independently of the transmit interval for transmitting keepalive packets to the first receiver.

In some embodiments, the computer-readable storage medium further comprises instructions for controlling the one or more computer processors to designate a path to the first receiver network device as being in an INACTIVE state when a feedback packet corresponding to a given keepalive packet is not received within a feedback time.

In some embodiments, the computer-readable storage medium further comprises instructions for controlling the one or more computer processors to update the feedback time based on a current value of the transmit interval.

In accordance with the present disclosure, a method in a network device comprises transmitting keepalive packets to a first receiver at varying a transmission interval between transmissions; receive corresponding feedback packets from the first receiver; updating the transmission interval based at least on a transit time between when a keepalive packet is transmitted and when a corresponding feedback packet is received; and designating a path to the first receiver as being INACTIVE when a feedback packet corresponding to a given keepalive packet is not received within a feedback time computed based on a current value of the transmission interval.

In some embodiments, updating the transmission interval is based on a computation of transit times from previous keepalive/feedback packets.

In some embodiments, the method further comprises setting the transmission interval to a minimum value when updating the transmission interval results in the transmission interval being less than the minimum value.

In some embodiments, the minimum value is based on a number of receivers to which the network device transmits keepalive packets The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A network device comprising:
one or more computer processors; and
a computer-readable storage medium comprising instructions for controlling the one or more computer processors to:
(a) transmit a keepalive packet to a first receiver;
(b) receive a feedback packet from the first receiver corresponding to the transmitted keepalive packet;
(c) compute a transit time between when the keepalive packet was transmitted and when the corresponding feedback packet was received;
(d) compute a transmit interval based on the computed transit time;
(e) delay for a period of time based on the computed transmit interval; and
(f) repeat (a) through (e) with another keepalive packet, wherein the network device computes a plurality of transit times for respective pairs of transmitted keepalive packets and corresponding feedback packets, wherein the transmit interval is repeatedly updated based on the transit times computed for previously transmitted keepalive packets and their corresponding feedback packets, wherein the delay between transmission of keepalive packets depends on the transit time between when the keepalive packet was transmitted and when the corresponding feedback packet was received.

2. The network device of claim 1, wherein each keepalive packet includes a timestamp indicative of when the keepalive packet was transmitted, wherein each feedback packet includes the timestamp contained in the corresponding keepalive packet, wherein the transit time for a transmitted keepalive packet and its corresponding feedback packet is computed based on when the feedback packet was received and the timestamp contained in the feedback packet.

3. The network device of claim 1, wherein the updated transmit interval is limited to no less than a minimum transmit interval.

4. The network device of claim 3, wherein the minimum transmit interval is based on a number of receiver network devices to which the network device transmits keepalive packets.

5. The network device of claim 1, wherein the computer-readable storage medium further comprises instructions for controlling the one or more computer processors to transmit keepalive packets to a second receiver and receive corresponding feedback packets from the second receiver, wherein keepalive packets are transmitted to the second receiver at a transmit interval computed independently of the transmit interval for transmitting keepalive packets to the first receiver.

6. The network device of claim 1, wherein the computer-readable storage medium further comprises instructions for controlling the one or more computer processors to designate a path to the first receiver network device as being in an INACTIVE state when a feedback packet corresponding to a given keepalive packet is not received within a feedback time.

7. The network device of claim 6, wherein the computer-readable storage medium further comprises instructions for controlling the one or more computer processors to update the feedback time based on a current value of the transmit interval.

8. A method in a network device, the method comprising the network device:
    (a) transmitting a keepalive packet to a first receiver;
    (b) receiving a feedback packet from the first receiver corresponding to the transmitted keepalive packet;
    (c) computing a transit time between when the keepalive packet was transmitted and when the corresponding feedback packet was received;
    (d) computing a transmit interval based on the computed transit time;
    (e) delaying for a period of time based on the computed transmit interval; and
    (f) repeating (a) through (e) with another keepalive packet, wherein the network device computes a plurality of transit times for respective pairs of transmitted keepalive packets and corresponding feedback packets, wherein the transmit interval is repeatedly updated based on the transit times computed for previously transmitted keepalive packets and their corresponding feedback packets, wherein the delay between transmission of keepalive packets depends on the transit time between when the keepalive packet was transmitted and when the corresponding feedback packet was received.

9. The method of claim 8, wherein each keepalive packet includes a timestamp indicative of when the keepalive packet was transmitted, wherein each feedback packet includes the timestamp contained in the corresponding keepalive packet, wherein the transit time for a transmitted keepalive packet and its corresponding feedback packet is computed based on when the feedback packet was received and the timestamp contained in the feedback packet.

10. The method of claim 8, wherein the updated transmit interval is limited to no less than a minimum transmit interval.

11. The method of claim 10, wherein the minimum transmit interval is based on a number of receiver network devices to which the network device transmits keepalive packets.

12. The method of claim 8, further comprising the network device transmitting keepalive packets to a second receiver and receive corresponding feedback packets from the second receiver, wherein keepalive packets are transmitted to the second receiver at a transmit interval computed independently of the transmit interval for transmitting keepalive packets to the first receiver.

13. The method of claim 8, further comprising the network device designating a path to the first receiver network device as being in an INACTIVE state when a feedback packet corresponding to a given keepalive packet is not received within a feedback time.

14. The method of claim 13, further comprising the network device updating the feedback time based on a current value of the transmit interval.

15. A non-transitory computer-readable storage device having stored thereon computer executable instructions, which when executed by a computer device, cause the computer device to:
    (a) transmit a keepalive packet to a first receiver;
    (b) receive a feedback packet from the first receiver corresponding to the transmitted keepalive packet;
    (c) compute a transit time between when the keepalive packet was transmitted and when the corresponding feedback packet was received;
    (d) compute a transmit interval based on the computed transit time;
    (e) delay for a period of time based on the transmit interval; and
    (f) repeat (a) through (e) with another keepalive packet, wherein the network device computes a plurality of transit times for respective pairs of transmitted keepalive packets and corresponding feedback packets, wherein the transmit interval is repeatedly updated based on the transit times computed for previously transmitted keepalive packets and their corresponding feedback packets, wherein the delay between transmission of keepalive packets depends on the transit time between when the keepalive packet was transmitted and when the corresponding feedback packet was received.

16. The non-transitory computer-readable storage device of claim 15, wherein each keepalive packet includes a timestamp indicative of when the keepalive packet was transmitted, wherein each feedback packet includes the timestamp contained in the corresponding keepalive packet, wherein the transit time for a transmitted keepalive packet and its corresponding feedback packet is computed based on when the feedback packet was received and the timestamp contained in the feedback packet.

17. The non-transitory computer-readable storage device of claim 15, wherein the updated transmit interval is limited to no less than a minimum transmit interval.

\* \* \* \* \*